United States Patent [19]

Bilange et al.

[11] Patent Number: 5,527,002
[45] Date of Patent: Jun. 18, 1996

[54] ELECTRICAL FLIGHT CONTROL SYSTEM FOR AN AIRPLANE, WITH ATTITUDE PROTECTION ON TAKEOFF

[75] Inventors: Thierry Bilange, Tournefeuille; Xavier Le Tron, Toulouse, both of France

[73] Assignee: Aerospatiale Societe Nationale Industrielle, Paris, France

[21] Appl. No.: 314,815

[22] Filed: Sep. 29, 1994

[51] Int. Cl.⁶ .................................................. B64C 13/16
[52] U.S. Cl. ............................................. 244/181; 244/195
[58] Field of Search .................................. 244/76 R, 181, 244/195, 180, 177, 175

[56] References Cited

U.S. PATENT DOCUMENTS

| | | | |
|---|---|---|---|
| 3,216,676 | 11/1969 | Brown et al. | 244/195 |
| 3,594,553 | 7/1971 | McElroy | 244/181 |
| 3,945,590 | 3/1976 | Kenney, Jr. et al. | 244/77 |
| 3,963,197 | 6/1976 | Oberlerchner | 244/181 |
| 4,763,266 | 8/1988 | Schultz et al. | 244/181 |

FOREIGN PATENT DOCUMENTS

| | | |
|---|---|---|
| 0261015 | 3/1988 | France . |
| WO93/02405 | 2/1993 | WIPO . |

*Primary Examiner*—Galen L. Barefoot
*Attorney, Agent, or Firm*—Marshall O'Toole; Gerstein, Murray & Borum

[57] ABSTRACT

According to the invention, attenuator means (8) are provided, making it possible to limit the rate of rotation of the airplane on takeoff, so as to avoid the tail of the airplane striking the ground and to reduce the dispersion of the rotation rates.

8 Claims, 2 Drawing Sheets

5,527,002

ELECTRICAL FLIGHT CONTROL SYSTEM FOR AN AIRPLANE, WITH ATTITUDE PROTECTION ON TAKEOFF

BACKGROUND OF THE INVENTION

The present invention relates to aircraft, especially modern transport airplanes, equipped with an electrical flight controls system.

It is known that, in such aircraft in flight, the piloting commands given by the pilot or pilots by means of control members such as, for example, minicontrol columns, are transmitted to computers via position sensors, associated with said control members and generating electrical signals representative of the position of said control members activated by the pilots. Thus, in attitude control, the position of such a control member is converted by said computers into an attitude value and the system controls the movement of the aircraft via elevator aerodynamic control surfaces, so that the actual attitude of the aircraft becomes equal to the value demanded by the pilot, by actuating said control member.

In contrast, on the ground, in the known flight control systems, the deflection commands for the elevator aerodynamic control surfaces (elevator control surfaces) are quite simply proportional to the movements of said control member displaced by the pilot. Hence, if the pilot pulls back fully on said control member, the elevator control surfaces are deflected to their maximum value.

This results in considerable drawbacks.

First of all, on takeoff, there is a risk, if the pilot demands too high an attitude too close to the ground, that the rear part of the fuselage of the airplane will touch the ground and will be damaged.

Moreover, on takeoff, the attitude variation as a function of time—also called rotation rate—varies as a function of the loading of the airplane and of the style of piloting. For a given airplane, this results in a dispersion in the values of the rotation rate, which reduces the "demonstrated performance". In fact, the regulations of the certification authorities define the performance (length of runway, etc.) with margins which depend on the difference between the "maximum rotation rate", the maximum value of the rates of rotation of the longitudinal attitude which are demonstrated on test, and the "mean rotation rate", which is the mean value of these rotation rates. The closer these rates are, the more the potential performance of the airplane is taken advantage of, by reducing the definition margins.

SUMMARY OF THE INVENTION

The object of the present invention is to remedy these drawbacks, by acting to eliminate the risk of striking the ground with the tail of the airplane during takeoff, and to reduce the dispersion in the rotation rates on takeoff.

To this end, according to the invention, the electrical system for control of an elevator aerodynamic surface of an airplane, of the type including:

a control member actuated by the pilot of the airplane and associated with a position sensor delivering an electrical signal representative of the angle of deflection of said elevator aerodynamic surface on the ground and of the desired attitude for the airplane in flight;

motor means for control of said elevator aerodynamic surface; and calculating means mounted between said position sensor and said motor means, receiving said signal delivered by said sensor and delivering a control signal for said motor means in order to impart, to said aerodynamic surface, a movement such that said aerodynamic surface, on the ground, reaches an angular position defined by the position of said control member or such that the airplane, in flight, reaches an attitude corresponding to said desired attitude, is noteworthy in that it includes:

generator means for delivering an electrical signal representative of the actual rate of rotation of said airplane; and attenuator means for attenuating, in pitch-up, said control signal addressed by said calculating means to said motor means, said attenuator means receiving said electrical signal representative of said actual rotation rate and exerting an attenuation as a function of the value of said electrical signal representative of said actual rotation rate.

Hence, in the flight control system in accordance with the present invention, the high rotation rates are limited by said attenuator means, so that it is no longer possible, when the airplane is piloted normally but without a specific precaution, for the tail of the airplane to come to touch the ground, and so that there results a reduction in the dispersion of the high rotation rates on takeoff.

The attenuation law imposed by said attenuator means may be such that the attenuation grows with the rotation rate. However, in a preferred embodiment, it is arranged that said attenuation grows progressively when said actual rotation rate grows from zero up to a threshold of said actual rotation rate and is constant beyond said threshold.

The generator means of the signal representative of the actual rotation rate may be formed by an attitude detector associated with a differentiator, or also by the appropriate part of the on-board inertia unit.

Said attenuator means preferably include:

a first function generator, receiving, at its input, said electrical signal representative of said actual rotation rate and delivering at its output a first coefficient k, the value of which, lying between 0 and 1, depends on the value of said actual rotation rate; and a first multiplier for multiplying said control signal delivered by said calculating means with said first coefficient k, before this control signal is addressed to said motor means.

Hence, the attenuation of said control signal stems from the value of said first multiplier coefficient k, lower than 1 (except when the rotation rate is zero) and a function of the value of said actual rotation rate.

It is advantageous to provide switch means making said attenuator means active only during the takeoff of the airplane. Thus, in flight, said attenuator means do not risk interfering with a possible programmed elevation control law, stored in said calculating means.

Moreover, so as not to hinder a possible acceleration-stop maneuver likely to interrupt the takeoff roll on the ground of an airplane taking off, said system in accordance with the present invention may include means inhibiting the action of said attenuator means in the event that, during takeoff, said control member takes up a position corresponding to pitch-down.

In the event that said control member can move on either side of a neutral position, separating the total range of movement of said control member into a region corresponding to pitch-up and a region corresponding to pitch-down, it is advantageous for said inhibition means to include:

a second function generator, receiving at its input said electrical signal representative of the desired attitude and delivering at its output a second coefficient g, the value of which, equal to 0 or 1, depends on said region in which said control member is found with respect to said neutral position; and a second multiplier for multiplying said signal representative of the actual rotation rate delivered by said generator means with said second coefficient g, before the latter signal is addressed to said attenuator means.

DESCRIPTION OF THE DRAWINGS

The figures of the attached drawing will give a good understanding of how the invention can be produced. In these figures, identical references designate similar elements.

DETAILED DESCRIPTION OF THE PREFERRED EMBODIMENT

In the expositions below, the electrical signals representative of the various magnitudes are designated by the same references ($\theta d$, $d\theta/dt$, p, dp/dt, etc.) as the magnitudes.

Figure 1:
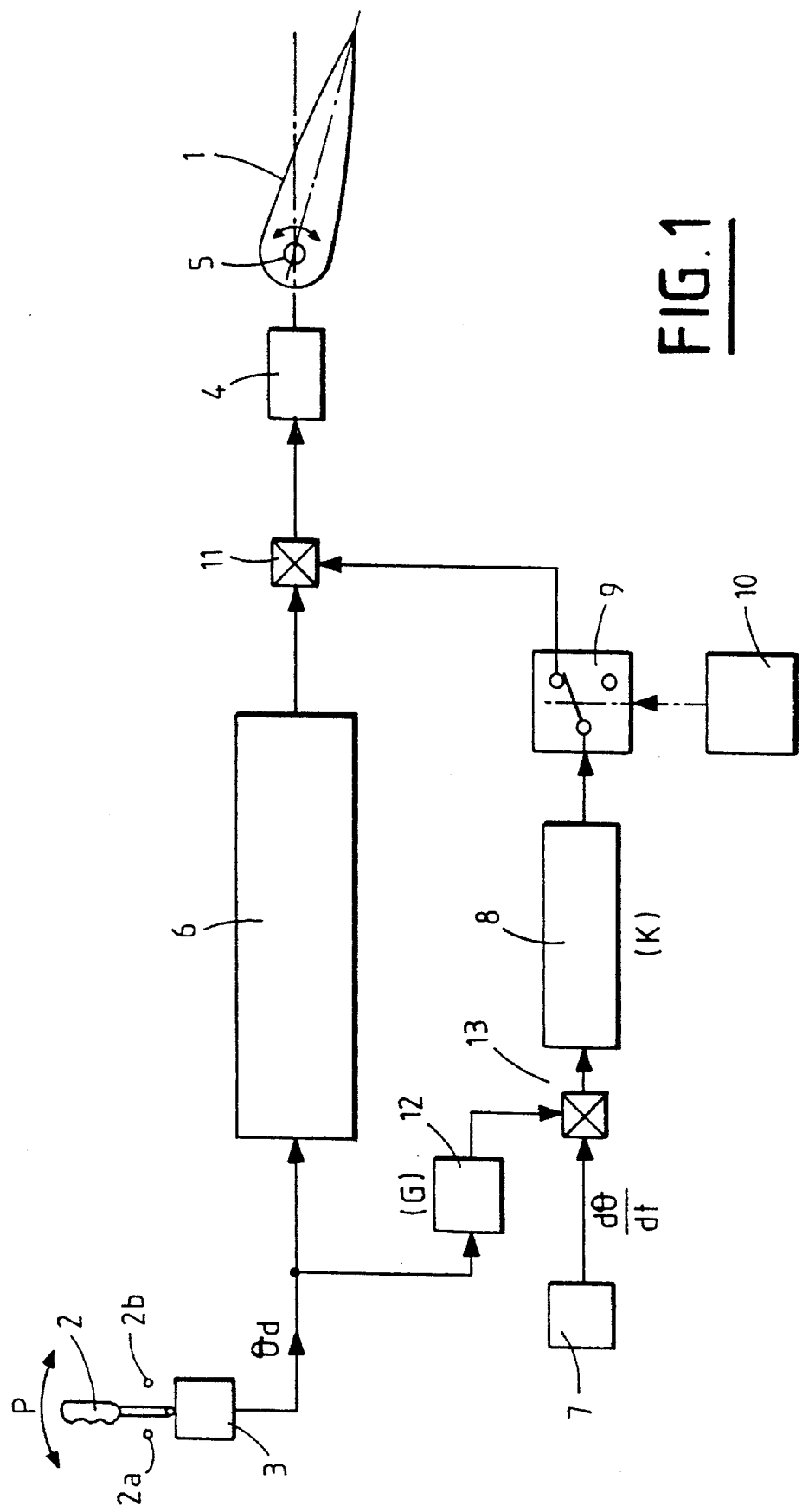
FIG. 1 gives the block diagram of the system in accordance with the present invention.

The system, shown diagrammatically in FIG. 1, is intended to control one or more aerodynamic surfaces 1 controlling the piloting of an airplane (not represented) in elevation. This system includes, in a known way:

- a control member 2, such as a control column, capable of being actuated by a pitch-down stop 2a and a pitch-up stop 2b by the pilot or the co-pilot of the aircraft and associated with a position sensor 3, for example of potentiometric type, delivering an electrical signal representative of the position p of said control member 2, that is to say of an attitude $\theta d$, desired by the said pilot for the aircraft;

- a motor or jack 4, intended for control of said aerodynamic surface 1, so as to make it pivot about its axis of articulation on said aircraft, in order to make the attitude of said aircraft vary; and

- calculating means 6, receiving the signals from said position sensor 3 which are intended to control the motor or the jack 4 in order to impart a movement to said aerodynamic surface 1, so that said aerodynamic surface, on the ground, reaches an angular position defined by the position of said control member 2 or such that the airplane, in flight, reaches an attitude corresponding to said desired attitude.

Thus it is seen that, in the system of FIG. 1:

the deflection of the aerodynamic surface 1, and thus the attitude of the airplane, are directly proportional to the displacement p of the control member 2; and the speed of variation of the deflection of the aerodynamic surface 1, and thus the rate of rotation of the airplane, are directly proportional to the demand p resulting from the displacement of the control member 2.

Moreover, it is known that, for a given airplane, the lift is—except for high incidence values—directly proportional to the incidence. However, in proximity to the ground and to a first approximation, the incidence can be regarded as directly related to attitude. Thus, on takeoff, the increase in lift is, to a first approximation, directly proportional to the increase in attitude.

Thus it results that a pilot may be tempted, during takeoff, after having accelerated the airplane rolling on the ground up to the takeoff initiation speed, to make a rapid takeoff by applying to the control member 2 a significant displacement (p is then large) in the pitch-up direction, entailing a significant speed of attitude variation, so as to cause the lift to increase rapidly. In this case, the rise in attitude may be so rapid that the tail of the airplane touches the ground, which risks damaging or even destroying this airplane.

Figure 2:
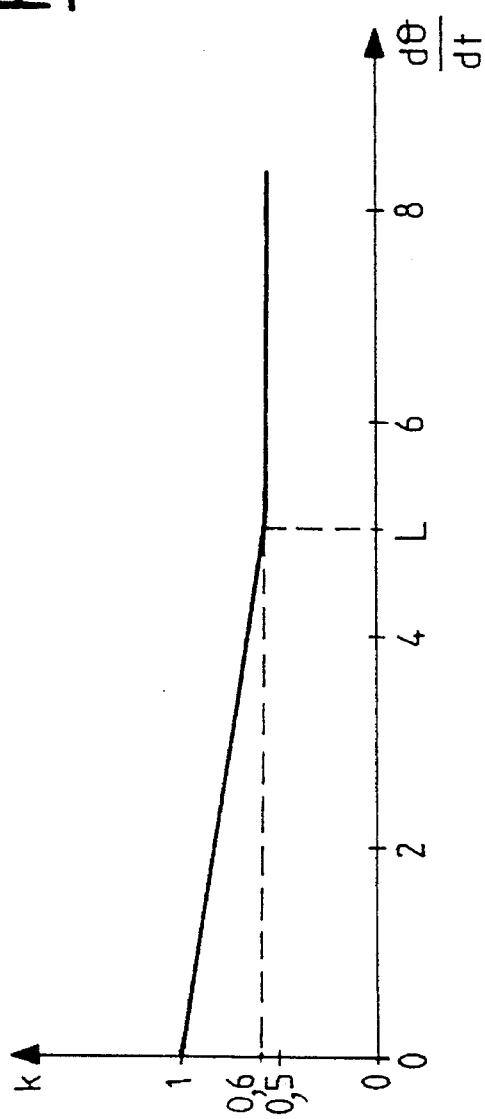
FIG. 2 is a diagram giving, as a function of the actual rotation rate, the response of the attenuator means of the system in accordance with the present invention.

In order to avoid this drawback, the system shown by FIG. 1, in accordance with the invention, includes:

- a generator 7 capable of delivering the actual rotation rate $d\theta/dt$ of the airplane. The generator 7 may consist of an attitude detector associated with a differentiator or by the corresponding part of an inertia unit mounted on board the airplane;

- a function generator 8, receiving at its input the actual rotation rate delivered by the generator 7 and delivering at its output a coefficient k, the value of which, lying between 0 and 1, depends on the value of said rotation rate. In FIG. 2 an example of a function K has been represented, representing the coefficient k as a function of the rotation rate $d\theta/dt$, the latter being expressed in degrees per second;

- a controlled switch 9, the input of which is linked to the output of the function generator 8. It is clear that, although represented in the form of a switch with a moving member for easy understanding, said switch 9 may be of static type;

- a device 10 for control of the switch 9, capable of identifying the takeoff phase. The device 10 may be a detector of the type described in the French Patent Application No. 93 05851 of 14 May 1993, or a simple logic circuit receiving, from the various on-board detectors, information on the speed of the engines, the rolling speed, the status of the landing gear which is extended and loaded, the status of the brakes which are unlocked, the retracted status of the thrust inverters, etc., and capable of determining the takeoff phase from this information; and

- a multiplier 11, interposed between the calculating means 6 and the motor or the jack 4 and linked to the output of the controlled switch 9.

Outside of the takeoff phase (in flight), the switch 9 is driven to the open state, so that the circuit branch 7, 8, 9 and 10 takes no action. In this case, a demand p produced by the pilot by actuating the member 2 generates, via the position sensor 3, a rotation rate $d\theta d/dt$ desired by the pilot and addressed to the calculating means 6. From this rotation rate $d\theta d/dt$, said calculation means 6 calculate the orders to be addressed to the motor or jack 4 so that the latter actuates the control surface 1, so that the airplane reaches this desired rotation rate. The said commands are transmitted, through the said multiplier 11, which is then neutral with respect to the transmission.

In contrast, during the takeoff phase, the switch is closed and the multiplier 11 then receives the coefficient k generated by the function generator 8. Consequently, the deflection commands derived by the calculation means 6 (in the way described above) are multiplied by the coefficient k in the multiplier 11.

Referring to FIG. 2, it is seen that:

if the actual rotation rate dθ/dt of the airplane is small (for example less than 1 degree per second), the coefficient k is equal or practically equal to 1, so that the commands addressed to the motor or jack 4 are those derived by the calculation means 6 and so that the airplane will follow the desired rotation rate, demanded by the pilot;

if the actual rotation rate dθ/dt of the airplane is high (for example greater than 5 degrees per second), the coefficient k is very much less than 1 (for example equal to 0.6), so that the commands derived by the calculation means 6 are heavily attenuated in the multiplier 11, before being addressed to the motor or jack 4. In this case, the airplane will be obliged to follow a rotation rate very much lower than that demanded by the pilot;

if the actual rotation rate dθ/dt of the airplane is average (for example of the order of 2 degrees per second), the coefficient k is less than 1, without being very far from it, so that the airplane is obliged to follow a rotation rate slightly less than that demanded by the pilot.

Thus it is seen that the system in accordance with the invention makes it possible to modulate the action of the pilot on takeoff as far as the rotation rate of the airplane is concerned, so that:

the risk when the airplane is piloted normally, but without a specific precaution, that the airplane will touch the ground with its tail is eliminated; and the dispersion in the rotation rates on takeoff is reduced, which makes it possible to reduce the operational takeoff speeds and the length of runways.

The modulation of the pitch-up command from the pilot, in the event that the rotation rate becomes too high, is progressive in order not to disturb the natural piloting of the airplane and limited so that the pilot keeps sufficient authority. It will be noted that the coefficient k is never zero (in the example of FIG. 2, its smallest value is equal to 0.6), which guarantees a minimum of authority for the pilot by actuating the member 2.

In the example of FIG. 2, the function K consists of two consecutive straight-line segments:

the first segment, which corresponds to values of the actual rotation rate stretching from 0 to a threshold L, for example equal to 5 degrees per second, causes the coefficient k to decrease from the value 1 to the value 0.6; and the second segment, which corresponds to values of the actual rotation rate greater than the threshold L, keeps the coefficient k constant at the value 0.6, whatever the value of the actual rotation rate.

The curve K shown by FIG. 2 is only one embodiment example. Depending on the actual rotation rate desired and on the airplane involved, the curve K may exhibit another profile. For example, it may consist of a plurality (greater than 2) of consecutive straight-line segments.

Figure 3:
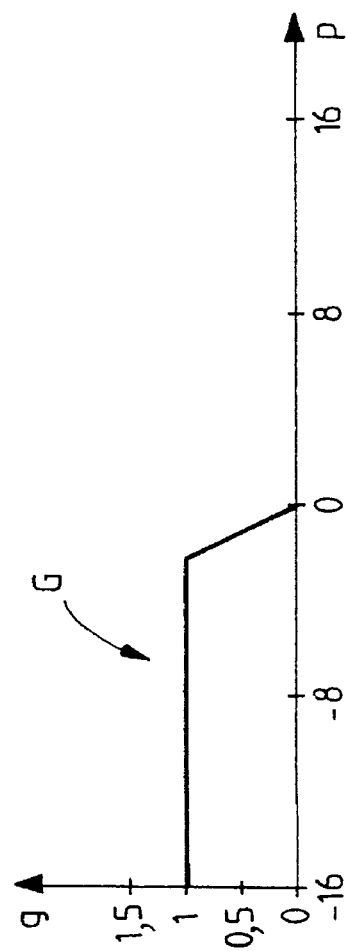
FIG. 3 is a diagram giving, as a function of the movement of the control member of the airplane, the response of the means for inhibiting said attenuator means.

As can be seen in FIG. 1, the system in accordance with the present invention further includes:

another function generator 12, receiving, at its input, the attitude θd desired by the pilot and delivered by the position sensor 3 and delivering, at its output, a coefficient g, the value of which, equal to 0 or 1, depends on the fact that the actuating member 2 is set for a pitch-down or pitch-up demand. In FIG. 3, an example of a function G, representing the coefficient g has been represented. It is assumed here that the actuating member 2 is a rotary column, the rotational amplitude of which, on either side of its neutral position 0, is of 16 degrees. The range from 0 to −16 degrees corresponds to pitch-up and to the displacement of the column 2 between its neutral position (illustrated in FIG. 1) and its extreme pitch-up position, when it arrives in abutment against the pitch-up stop 2b, while the range from 0 to +16 degrees corresponds to pitch-down and to the displacement of the column 2 between said neutral position and its extreme pitch-down position when it arrives in abutment against the pitch-down stop 2a; and another multiplier 13, interposed between the generator 7 and the function generator 8 and linked to the output of the function generator 12, so as to form the product of the actual rotation rate of the airplane and the coefficient g.

With the coefficient g being equal to 1 over the range of values of p corresponding to pitch-up and to 0 over the range of values of p corresponding to pitch-down, it is seen that the product g.dθ/dt is equal to dθ/dt for pitch-up commands and 0 for pitch-down commands.

Thus the circuit branch 12,13 has no influence when the column 2 is in pitch-up position, but inhibits the circuit branch 7 to 11 when the column 2 is in pitch-down position.

Thus it is seen that, if, during the takeoff roll, the pilot is obliged to order an abrupt stopping of the airplane (acceleration-stop) accompanied by the column 2 passing from the pitch-up range to the pitch-down range, the attitude limiter means in accordance with the invention are completely inhibited.

As FIG. 3 shows, the curve G, for the neutral position (p=0), advantageously has a slightly inclined edge rather than an absolutely sheer edge.

We claim:

1. An electrical system for control of an elevator aerodynamic surface (1) of an airplane in proximity to the ground, of the type including:

a control member (2) actuated by the pilot of the airplane and associated with a position sensor (3) delivering an electrical signal representative of the angle of deflection of said elevator aerodynamic surface on the ground and of the desired attitude (θd) for the airplane in flight;

motor means (4) for control of said elevator aerodynamic surface (1); and calculating means (6) mounted between said position sensor (3) and said motor means (4), receiving said signal delivered by said sensor (3) and delivering a control signal for said motor means (4) in order to impart, to said aerodynamic surface (1), a movement such that said aerodynamic surface, on the ground, reaches an angular position defined by the position of said control member or such that the airplane, in flight, reaches an attitude corresponding to said desired attitude, which includes:

generator means (7) for delivering an electrical signal representative of the actual rate of rotation of said airplane; and attenuator means (8,11) for attenuating, in pitch-up, said control signal addressed by said calculating means (6) to said motor means (4), said attenuator means receiving said electrical signal representative of said actual rotation rate and exerting an attenuation as a function of the value of said electrical signal representative of said actual rotation rate.

2. The system as claimed in claim 1, wherein said attenuation grows progressively when said actual rotation rate grows from zero up to a threshold (L) of said actual rotation rate, and is constant beyond said threshold (L).

3. The system as claimed in claim 1, wherein said attenuator means include:

a first function generator (8), receiving, at its input, said electrical signal representative of said actual rotation rate and delivering at its output a first coefficient (k), the value of which, lying between 0 and 1, depends on the value of said actual rotation rate; and a first multiplier (11) for multiplying said control signal addressed by said calculating means (6) with said first coefficient (k), before this control signal is addressed to said motor means (4).

4. The system as claimed in claim 1, which includes switch means (9,10) making said attenuator means active only during the takeoff of the airplane.

5. The system as claimed in claim 3, which includes means (12,13) inhibiting the action of said attenuator means (8,11) in the event that, during the takeoff, said control member (2) takes up a position corresponding to pitch-down.

6. The system as claimed in claim 5, in which said control member can move on either side of a neutral position, separating the total range of deflection of said control member into a region corresponding to pitch-up and a region corresponding to pitch-down, wherein said inhibition means include:

a second function generator (12), receiving at its input said electrical signal representative of the desired attitude and delivering at its output a second coefficient (g), the value of which, equal to 0 or 1, depends on said region in which said control member is found with respect to said neutral position; and a second multiplier (13) for multiplying said signal representative of the actual rotation rate addressed by said generator means (7) with said second coefficient (g), before the latter signal is addressed to said attenuator means (8,11).

7. An electrical system for control of an aerodynamic surface of an airplane in proximity to the ground, with attitude protection on take-off to eliminate the risk of striking the ground with the tail of the airplane during take-off, said system comprising:

a control member actuated by a pilot of the airplane and associated with a position sensor delivering an electrical signal representative of the angle of deflection of said aerodynamic surface on the ground;

motor means for control of said aerodynamic surface;

calculating means, coupled between said position sensor and said motor means, for receiving said electrical signal delivered by said position sensor and delivering a control signal for said motor means in order to impart, to said aerodynamic surface, a movement such that said aerodynamic surface, on the ground, reaches an angular position defined by the position of said control member;

generator means for delivering an electrical signal representative of the actual rate of rotation of said airplane;

attenuator means for attenuating said control signal, said attenuator means receiving said electrical signal representative of said actual rotation rate and exerting an attenuation as a function of the value of said electrical signal representative of said actual rotation rate; and inhibiting means making said attenuator means active only during take-off of said airplane.

8. An electrical system for control of an aerodynamic surface of an airplane in proximity to the ground, with attitude protection on take-off to eliminate the risk of striking the ground with the tail of the airplane during take-off, said system comprising:

a control member actuated by a pilot of the airplane and associated with a position sensor delivering an electrical signal representative of the angle of deflection of said aerodynamic surface on the ground;

motor means for control of said aerodynamic surface;

calculating means, coupled between said position sensor and said motor means, for receiving said electrical signal delivered by said position sensor and delivering a control signal for said motor means in order to impart, to said aerodynamic surface, a movement such that said aerodynamic surface, on the ground, reaches an angular position defined by the position of said control member;

generator means for delivering an electrical signal representative of the actual rate of rotation of said airplane; and attenuator means for attenuating said control signal, said attenuator means receiving said electrical signal representative of said actual rotation rate and exerting an attenuation as a function of the value of said electrical signal representative of said actual rotation rate.

* * * * *